TELEVISION RECEIVER ANTENNA COUPLING CIRCUIT

Filed Oct. 8, 1953

INVENTOR.
George W. Fyler
BY
Foorman L. Mueller
Atty.

United States Patent Office 2,819,390

Patented Jan. 7, 1958

2,819,390

TELEVISION RECEIVER ANTENNA COUPLING CIRCUIT

George W. Fyler, Lombard, Ill., assignor to Motorola, Inc., Chicago, Ill., a corporation of Illinois Application October 8, 1953, Serial No. 384,830

6 Claims. (Cl. 250—20)

The present invention relates to television receivers and more particularly to an improved and simplified antenna coupling network for use in a television receiver.

It is usual in most present-day television receivers to provide a tuned inductance coil in the network coupling and television antenna to the radio frequency amplifier input stage of the television receiver. This inductance coil is tuned in unison with other circuits of the receiver to various signal channels in the television frequency band, and this tuning is usually accomplished by a rotary switch successively contacting taps on the coil or by similar mechanisms. In such a television receiver, it is usually necessary to transform the balanced impedance of the television antenna to the unbalanced input impedance of the radio frequency amplifier. This is achieved in the antenna coupling network of most present-day television receivers by what is usually termed a double "balun" transformer comprising two double wound inductance coils. This transformer transforms the balanced impedance of the antenna to an unbalanced coupling impedance, and the transformer and tuned inductance coil referred to above match this unbalanced impedance with the unbalanced input impedance of the radio frequency amplifier to provide optimum signal-to-noise ratio at the input of the radio frequency amplifier. The balun transformer, however, is relatively expensive and, in addition, requires a line to couple it to the antenna terminals of the receiver, which terminals are usually mounted on the back of the receiver cabinet.

In accordance with the present invention, the balun transformer is replaced by a four-wire balanced-to-unbalanced transmission line transformer which couples the antenna input terminals of the receiver to the tuned inductance coil and associated coupling inductance coil of the antenna coupling network. This transmission line transforms the balanced impedance of the antenna (usually of the order of 300 ohms) to an unbalanced impedance (for example, 75 ohms or ¼ of the surge impedance of the line), and the latter impedance is matched by inductance means including the tuned inductance coil to a desired unbalanced impedance for optimum signal-to-noise ratio for the signal applied to the input of the radio frequency amplifier. Such a transmission line is relatively inexpensive and replaces not only the relatively expensive balun transformer but also replaces the line previously required to couple the balun transformer to the antenna input terminals.

It is, accordingly, an object of the present invention to provide in a television receiver a relatively simple and inexpensive coupling network for coupling the input leads of a balanced impedance television antenna to the radio frequency amplifier of the receiver which has an unbalanced input impedance.

A feature of the invention is the provision in a television receiver of an antenna coupling network that utilizes a transmission line for transforming the balanced antenna impedance to an unbalanced impedance, and which includes means for matching the unbalanced impedance with the input impedance of the radio frequency amplifier of the receiver for optimum signal-to-noise ratio.

Another feature of the invention is the provision in a television receiver of an improved antenna coupling network that incorporates a transmission line transformer for transforming the balanced antenna impedance to an unbalanced impedance, the line having a pair of spaced parallel outer conductors connected at one end to the antenna terminals of the receiver and whose other ends are coupled respectively to a point of reference potential and to a tuned inductance means included in the antenna coupling network, and the line also having a pair of spaced parallel inner conductors connected together at the antenna terminal end of the line and cross-connected to the other conductors at the other end of the line.

The above and other features of the invention which are believed to be new are set forth with particularity in the appended claims. The invention itself, however, together with further objects and advantages thereof, may best be understood by reference to the following description when taken in conjunction with the accompanying drawing in which:

Figures 1, 2, 3:
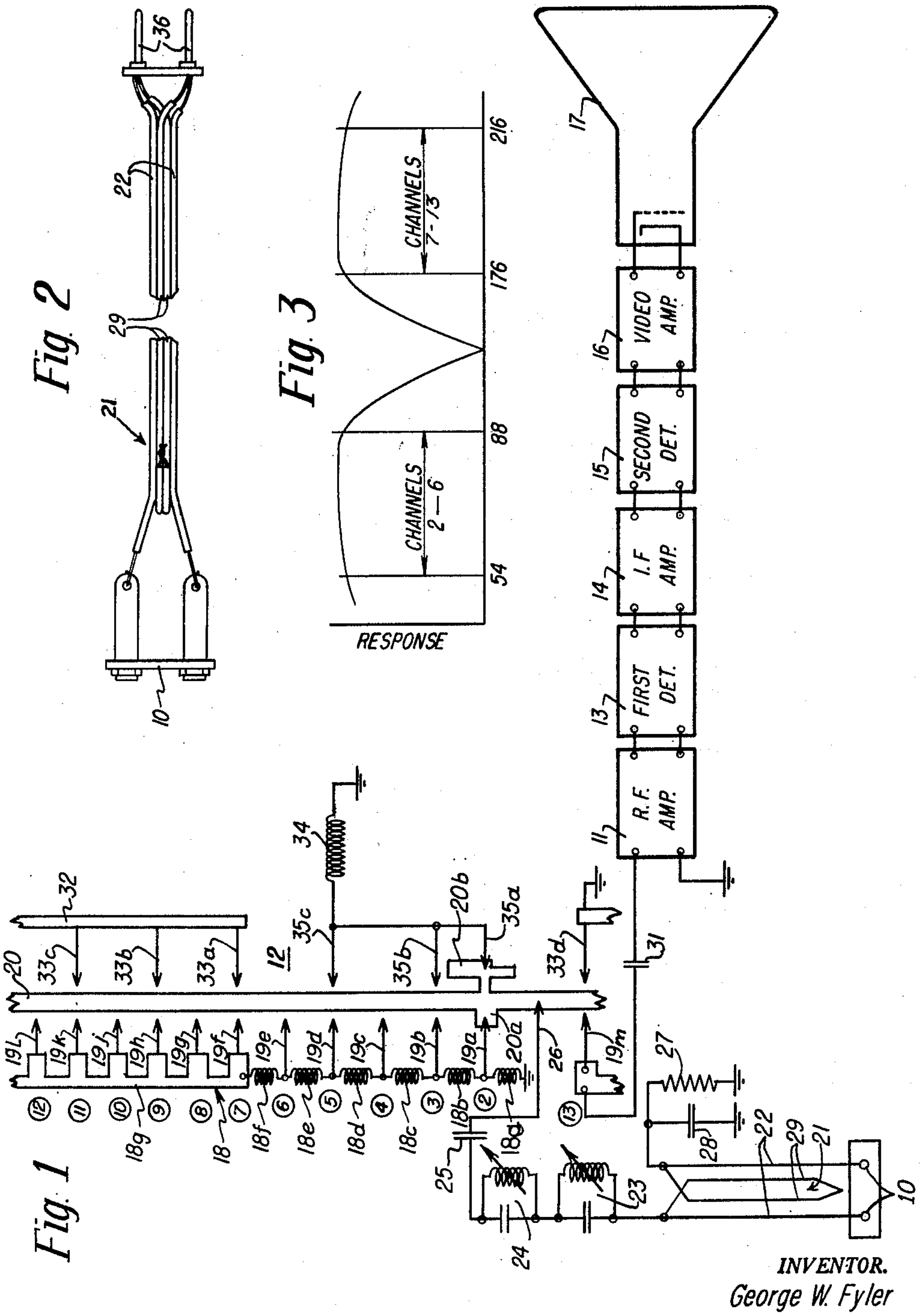
Figure 1 shows a television receiver incorporating the improved antenna coupling network of the invention.
Figure 2 shows a transmission line transformer used in the antenna coupling network.
Figure 3 shows the characteristic response curve of a preferred embodiment of the transmission line.

The present invention provides an antenna coupling network for use in a television receiver and which is interposed between the antenna input terminals of the receiver and the receiver input stage. The antenna has a balanced impedance and the input stage of the receiver has an unbalanced input impedance. The coupling network comprises a tuned inductance means tunable to a plurality of predetermined signal channels in a selected frequency band, and it also comprises a transmission line transformer for transforming the balanced antenna impedance to an unbalanced impedance of about ¼ the line surge impedance, the line being coupled between the antenna input terminals and the tuned inductance means. The transmission line transforms the balanced surge impedance of the antenna input leads to an unbalanced impedance of about ¼ this value and in conjunction with the tuned inductance means and associated impedance matching inductance means provides an unbalanced impedance for optimum signal-to-noise ratio for the signal applied to the input stage of the receiver.

The television receiver illustrated in Figure 1 includes a pair of antenna input terminals 10 which, in accordance with well-known practice, are mounted on a suitable insulating strip which in turn is usually affixed to the rear wall of the receiver cabinet. The receiver also includes a radio frequency amplifier 11 which forms the input stage of the receiver, and an antenna coupling network designated generally as 12 intercouples the antenna input terminals 10 to the radio frequency amplifier 11.

The output terminals of amplifier 11 are coupled through the first detector 13 to an intermediate frequency amplifier 14. The intermediate frequency amplifier is coupled through a second detector 15 to a video amplifier 16 which, in turn, is coupled to the input electrodes of a cathode ray image reproducing device 17. The sound and scanning portions of the television receiver form no part of the present invention and for that reason have not been shown.

When the receiver is tuned to a selected television signal, such signal is impressed on radio frequency amplifier 11 through the antenna input terminals 10 and coupling network 12. The signal is amplified in amplifier 11 and heterodyned to the selected intermediate frequency of the receiver in first detector 13. The resulting intermediate frequency signal is amplified in intermediate frequency amplifier 14 and applied to second detector 15 wherein it is detected to produce a composite video signal. The composite video signal is amplified in video amplifier 16 and impressed on the input electrodes of reproducing device 17 to control the intensity of the cathode ray beam therein in well-known manner.

The antenna coupling network 12 includes an inductance coil 18 which in turn includes a series of inductive sections **18*a*–18*f* and an inductive bar 18*g*. The inductance coil 18 has a series of intermediate taps 19*a*–19*m* connected in the manner illustrated between the various inductive sections, and also connected to successive points on the inductive bar 18*g*. The inductance coil 18 and distributed capacity associated therewith form a resonant tuning network for the receiver. One end of inductance coil 18 is connected to ground and its other end is coupled through a capacitor 31 to radio frequency amplifier 11. The antenna coupling network also includes switching contact means 20 in the form, for example, of a rotary switch which successively contacts the taps 19*a*–19*m* by means of a protruding portion 20*a***.

The antenna coupling network 12 also includes a balanced-to-unbalanced impedance transmission line transformer 21 for coupling the balanced antenna connected to terminals 10 to the tuned inductance coil 18. Transmission line 21 includes a pair of spaced parallel outer conductors 22 connected at one end to the antenna input terminals 10. One of the outer conductors is coupled at its other end through a pair of resonant trap networks 23, 24 and through a coupling capacitor 25 to a terminal 26 in sliding contact with switch contact means 20, and the other outer conductor is coupled at its other end to a point of reference potential or ground through a resistor 27 shunted by capacitor 28. Capacitor 28 by-passes radio frequency signals to ground to allow the use of a chassis conductively connected to the power line. The resistor 27 serves to bleed off any charges that might collect on the antenna. Trap 23 is tuned to the intermediate frequency band of the receiver to present a high impedance to interfering signal frequencies within this band. Trap 24, on the other hand, is tuned to the present-day frequency modulation band, whose low frequency end is adjacent present-day television channel 6, so as to prevent interference in the receiver from the frequency modulated signals in this band.

Transmission line 21 also includes a pair of spaced parallel inner conductors 29 which are also spaced and parallel to the outer conductors 22 and in the same plane therewith. Inner conductors 29 are connected together at the antenna input terminal end of the line and are cross-connected to the outer conductors at the other end of the line. In this manner, line 21 consists of two transmission lines lying side by side each having, for example, a characteristic impedance of 150 ohms. Looking into line 21 from terminals 10, the two lines appear in series so that the input impedance is 300 ohms. Looking into line 21 from the other end, the two lines appear in parallel so that the output impedance is 75 ohms.

An inductive impedance matching bar 32 is provided having one end connected to a point of reference potential or ground and having a series of intermediate taps **33*a*–33*d* which are successively contacted by a protruding portion 20*b* of switching contact means 20. In this manner, impedance matching inductances of different values are selectively connected between the tuned inductance coil 18 and ground, in correspondence with certain high frequency signal channels and in a manner to be described in more detail hereinafter, as switch contact means 20 is adjusted selectively to such channels. The antenna coupling network also includes an impedance matching inductance coil 34 having one end connected to ground and the other end connected to a series of taps 35*a*–35*c* adapted to be contacted by the protruding portion 20*b* of switching contact means 20**.

As previously noted, the antenna impedance is transformed by line 21 from, for example, 300 ohms balanced to 75 ohms unbalanced. The resulting unbalanced impedance is then matched to the input impedance of the radio frequency amplifier for optimum signal-to-noise ratio. This involves stepping up the 75 ohm unbalanced impedance and this is accomplished by coupling the antenna to a tap on tuned inductance coil 18 and by the impedance matching means discussed above which are selectively switched into the circuit. The antenna input lead 26 is selectively connected to the taps **19*a*–19*m* on inductance coil 18, corresponding to signal channels 2–13 in the television frequency band, by adjustment of switching contact means 20. The desired impedance matching for the inductance coil 18 is provided by inductance coil 34 for channels 2 to 6 in the television frequency band, and by selected portions of inductance bar 32 for channels 7 to 13. Coil 34 is the common matching impedance for all the low frequency channels (2–6) in the band. The impedance match for these channels is compromised by utilizing the known fact that over-coupling improves signal-to-noise ratio while reducing sensitivity only slightly. Therefore, over-coupling is provided for channel 6 by coil 34**, resulting in a slight loss in sensitivity, and optimum coupling is still realized for channel 2.

Assume now that the switching contact means 20 is in the illustrated position with its protruding portion **20*a* contacting tap 19*a* corresponding to channel 2. The television signal of channel 2 is impressed on the terminal 26 through a capacitor 25 and through switch contact means 20 to tap 19*a* on tuned inductance coil 18. For this channel, inductance coil 34 is connected across section 18*a* by tap 35*a* and portion 20*b* of switch contact means 20, and this coil assists in producing the desired impedance match for optimum signal-to-noise ratio for the input circuit of radio frequency amplifier 11**.

Similarly when switch contact means 20 is shifted so that its protruding portion **20*a* contacts tap 19*b* and connects terminal 26 thereto, tuning the receiver to channel 3, a desired impedance match is achieved by inductance coil 34 which is now connected across sections 18*a* and 18*b* of tuned inductance coil 18 through tap 13*b* and protruding portion 20*b* of switch contact means 20. Likewise, impedance matching inductance coil 34 is connected in circuit with the tuned inductance coil 18 when the protruding portion 20*a* of switch contact means 20 is successively switched to contact taps 19*c*–19*e* corresponding respectively to channels 4–6 and connect terminal 26** successively thereto.

When the portion **20*a* of the switch contact means 20 is adjusted to connect terminal 26 successively to taps 19*f*–19*m*, corresponding to channels 7–13, protruding portion 20*b* contacts successively taps 33*a*–33*d* which connect varying portions of the impedance matching inductive bar 32 across the various inductive sections of tuned inductance coil 18**. This provides the desired impedance match for optimum signal-to-noise ratio when the receiver is tuned to those latter channels.

The invention provides, therefore, an improved and simplified antenna coupling network in which the relatively expensive balun transformer usually used in television receivers is replaced by a balanced-to-unbalanced transmission line transformer which also replaces the line required to connect the balun transformer to the antenna input terminals.

The physical details of transmission line 21 are shown in Figure 2. The line extends between antenna terminals 10, and terminates preferably in a plug 36. Each conductor of the four conductor line is formed preferably of 7 strands of No. 28 copper with polyethylene insulation. For use in a television receiver of present-day design operating in the present standardized frequency range, the conductors of the line are spaced apart .095 inch (center to center), and the length of the line is 37 inches.

The characteristic impedance $$\left(Z_0=\sqrt{\frac{L}{C}}\right)$$

of the line when used in a television receiver, such as that referred to above, is 150 ohms as measured between two adjacent conductors.

With the dimensions referred to above the transmission line has characteristics such as shown in Figure 3. That is, the line exhibits uniform high response between 54 and 88 megacycles, corresponding to channels 2–6; and the line also exhibits uniform high response between 174 and 216 megacycles corresponding to channels 7–13. The length of the line is chosen so that the null falls between channels 6 and 7 (as shown), and the line attenuates the interfering band of signals between these channels.

While a particular embodiment of the invention has been shown and described, modifications may be made and it is intended in the appended claims to cover all such modifications as fall within the true spirit and scope of the invention.

I claim:

1. In a television receiver which comprises a pair of input terminals adapted to be connected to an antenna having a balanced impedance and which also comprises a radio frequency amplifier having an unbalanced input impedance, an antenna coupling network interposed between the input terminals and the amplifier including in combination, tuned inductance means tunable to a plurality of selected signal channels in a predetermined frequency band, a transmission line transformer for coupling the input terminals to said inductance means and transforming the balanced impedance of the antenna to an unbalanced impedance, said line having a pair of spaced parallel outer conductors connected at one end to the input terminals and coupled at the other end respectively to said inductance means and to a point of reference potential, said line having a pair of spaced parallel inner conductors connected together at the input terminal end of said line and cross-connected to said outer conductors at the other end of said line, and means for coupling said inductance means to the radio frequency amplifier and presenting an unbalanced impedance to said amplifier substantially matching the input impedance of said amplifier for optimum signal-to-noise ratio.

2. In a television receiver which comprises a pair of input terminals adapted to be connected to an antenna having a balanced impedance and which also comprises a radio frequency amplifier having an unbalanced input impedance, an antenna coupling network interposed between the input terminals and the amplifier including in combination, a tuned inductance coil having one end connected to a point of reference potential and having its other end coupled to the radio frequency amplifier, said inductance coil having a series of taps thereon, a transmission line transformer for converting the balanced impedance of the antenna to an unbalanced impedance, said transmission line having one end coupled to the input terminals, switching contact means coupled to the other end of said transmission line and successively connecting the same to said taps on said tuned inductance coil to adjust the resonant frequency of said inductance coil to selected signal channels in a predetermined frequency band, and impedance matching means selectively connected across portions of said inductance coil by said switching contact means, said connection of said inductance coil to the reference potential and said coupling thereof to the radio frequency amplifier being independent of said switching contact means, whereby said antenna coupling network presents to said amplifier an unbalanced impedance substantially matching the input impedance of said amplifier for optimum signal-to-noise ratio.

3. In a television receiver which comprises a pair of input terminals adapted to be connected to an antenna having a balanced impedance and which also comprises a radio frequency amplifier having an unbalanced input impedance, an antenna coupling network interposed between the input terminals and the amplifier including in combination, a tuned inductance coil having a series of taps thereon, said inductance coil having one end connected to a point of reference potential and having its other end coupled to the radio frequency amplifier, a transmission line transformer for transforming the balanced impedance of the antenna to an unbalanced impedance, said transmission line including first and second spaced parallel outer conductors respectively connected at one end to the input terminals, means for coupling the other end of said first outer conductor to a point of reference potential, and switching contact means coupled to the other end of said second outer conductor and successively coupling said second outer conductor to said taps on said tuned inductance coil to adjust the resonant frequency of said tuned inductance coil to selected channels in a predetermined frequency band, said connection of said inductance coil to the point of reference potential and said coupling thereof to the radio frequency amplifier being independent of said switching contact means.

4. In a television receiver which comprises a pair of input terminals adapted to be connected to an antenna having a balanced impedance and which also comprises a radio frequency amplifier having an unbalanced input impedance, an antenna coupling network interposed between the input terminals and the amplifier including in combination, a tuned inductance coil having a series of taps thereon for tuning the receiver to selected signal channels in a predetermined frequency range, a transmission line transformer for transforming the balanced impedance of the antenna to an unbalanced impedance, said transmission line including first and second spaced parallel outer conductors respectively connected at one end to the input terminals, means for coupling the other end of said first outer conductor to a point of reference potential, switching contact means coupled to the other end of said second outer conductor and successively coupling said second outer conductor to said taps on said tuned inductance coil to adjust the resonant frequency of said tuned inductance coil to said selected channels, said inductance coil having one end thereof connected to a point of reference potential independently of said switching contact means, said line having a pair of spaced parallel inner conductors connected together at the input terminal end of said line and cross-connected to said outer conductors at the other end of said line, said line having a selected length to exhibit substantially uniform response to said selected signal channels in said predetermined frequency range and to have a null point between two of such channels, and means independent of said switching contact means for coupling said inductance coil to the radio frequency amplifier and presenting an unbalanced impedance to said amplifier substantially matching the input impedance of said amplifier for optimum signal-to-noise ratio.

5. In a television receiver which includes a pair of input terminals adapted to be connected to an antenna having a balanced impedance and which also includes a radio frequency amplifier having an unbalanced input impedance, an antenna coupling network interposed between the input terminals and the amplifier including in combination, inductance means adapted to be tuned to each of a plurality of selected signal channels in a predetermined frequency band, a transmission line transformer for coupling the input terminals to said inductance means and for transforming the balanced impedance of the antenna to an unbalanced impedance, said line having a pair of spaced parallel outer conductors connected at one end to the input terminals and further having a pair of spaced parallel inner conductors connected together at the input terminal end of said line and cross connected at said outer conductors at the other end of said line, means connecting one of said outer conductors at said other end of said line to a point of reference potential, means for coupling the other of said outer conductors at said other end of said line to said inductance means, and means for coupling said inductance means to the radio frequency amplifier.

6. In a television receiver which comprises a pair of input terminals adapted to be connected to an antenna having a balanced impedance and which also comprises a radio frequency amplifier having an unbalanced input impedance, an antenna coupling network interposed between the input terminals and the amplifier including in combination, inductance means having a series of taps thereon and adapted to tune the receiver to selected signal channles in a predetermined frequency range, switch contact means for successively contacting said taps, a transmission line transformer for transforming the balanced impedance of the antenna to an unbalanced impedance, said transmission line including first and second spaced parallel outer conductors connected at one end to the input terminals, means for coupling the other end of said first outer conductor to a point of reference potential, means for coupling the other end of said second outer conductor to said switch contact means, said line further including a pair of spaced parallel inner conductors parallel to said outer conductors and in the same plane as said outer conductors, said inner conductors being connected together at the input terminal end of said line and cross connected to said outer conductors at the other end of said line, said line having a selected length to exhibit substantially uniform response to said selected signal channels in said predetermined frequency range, impedance matching means selectively connected in circuit with said inductance means by said switch contact means, and means for coupling said inductance means to the radio frequency amplifier to present an unbalanced impedance to said amplifier substantially matching the input impedance of said amplifier for optimum signal-to-noise ratio of the signal applied thereto.

References Cited in the file of this patent

UNITED STATES PATENTS

| | | |
|---|---|---|
| 2,137,266 | Case | Nov. 22, 1938 |
| 2,627,579 | Wassmansdoroff | Feb. 3, 1953 |
| 2,639,328 | Caraway | May 19, 1953 |
| 2,665,377 | Krepps | Jan. 5, 1954 |
| 2,728,818 | Mackey et al. | Dec. 27, 1955 |
| 2,750,496 | Horowitz et al. | June 12, 1956 |
| 2,757,343 | Eland | July 31, 1956 |